United States Patent [19]

Matsui

[11] Patent Number: 5,166,921
[45] Date of Patent: Nov. 24, 1992

[54] OPTICAL DISK CARRYING TRACKING INFORMATION IN MULTIPLE FORMATS AND APPARATUS FOR ANALYZING SAME

[75] Inventor: Fumio Matsui, Saitama, Japan
[73] Assignee: Pioneer Electronic Corporation, Tokyo, Japan
[21] Appl. No.: 708,817
[22] Filed: May 31, 1991

Related U.S. Application Data

[63] Continuation of Ser. No. 200,871, Jun. 1, 1988, abandoned.

[30] Foreign Application Priority Data

Jun. 17, 1987 [JP] Japan ................... 62-150589

[51] Int. Cl.$^5$ .............................................. G11B 7/24
[52] U.S. Cl. ............................ 369/275.3; 369/44.26; 369/44.27; 369/44.34; 369/58
[58] Field of Search ............. 369/44.11, 44.25, 44.26, 369/44.27, 44.34, 54, 58, 275.3, 275.4, 50; 358/342, 907

[56] References Cited

U.S. PATENT DOCUMENTS

| | | | |
|---|---|---|---|
| 4,142,209 | 2/1979 | Hedlund | 369/275.3 X |
| 4,486,870 | 12/1984 | Pettigrew et al. | 369/275.3 X |
| 4,535,439 | 8/1985 | Satoh et al. | 369/275.3 |
| 4,549,228 | 10/1985 | Dieterich | 358/907 X |
| 4,558,375 | 12/1985 | Sontheimer | 358/342 |
| 4,562,564 | 12/1985 | Bricot et al. | |
| 4,578,786 | 3/1986 | McIntosh et al. | 369/275.3 X |
| 4,701,897 | 10/1987 | Nakagawa | 358/907 X |
| 4,748,609 | 5/1988 | Yonezawa et al. | 369/275.3 X |
| 4,761,692 | 8/1988 | Yoshida et al. | 369/50 X |
| 4,766,502 | 8/1988 | Mashimo | 369/50 X |
| 4,787,076 | 11/1988 | Deguchi et al. | 369/58 X |
| 4,789,979 | 12/1988 | Hiraoka et al. | 369/275.4 |
| 4,797,752 | 1/1989 | Giddings | 369/275.3 X |
| 4,805,162 | 2/1989 | Stahl et al. | 369/44.26 |
| 4,885,644 | 12/1989 | Ishii et al. | 369/58 X |

FOREIGN PATENT DOCUMENTS

| | | |
|---|---|---|
| 0064438 | 11/1982 | European Pat. Off. . |
| 0166614 | 1/1986 | European Pat. Off. . |
| 0189135 | 7/1986 | European Pat. Off. . |
| 0252502 | 1/1988 | European Pat. Off. . |
| 0259666 | 3/1988 | European Pat. Off. . |
| 2048431 | 4/1972 | Fed. Rep. of Germany . |
| 3621326 | 1/1987 | Fed. Rep. of Germany . |

OTHER PUBLICATIONS

Disc Drives, Wireless World, Aug. 1982, pp. 33-36.
Patent Abstracts of Japan, vol. 8, No. 183 (P-296), Aug. 1984, & JP59-72660.
Patent Abstracts of Japan, vol. 10, No. 147 (P-460), May 1986, & JP60-263353.

Primary Examiner—Wayne R. Young
Attorney, Agent, or Firm—Sughrue, Mion, Zinn, Macpeak & Seas

[57] ABSTRACT

An optical disk for information interchange having two distinct areas, one of which is comparatively wider than the other, each of the areas having a different tracking information format, so that an apparatus can analyze the optical disc regardless of the tracking information format implemented in the apparatus. The two areas can be separated by a third disk portion which has no tracking information.

7 Claims, 2 Drawing Sheets

OPTICAL DISK CARRYING TRACKING INFORMATION IN MULTIPLE FORMATS AND APPARATUS FOR ANALYZING SAME

This is a Continuation of application Ser. No. 07/200,871 filed Jun. 1, 1988, now abandoned.

BACKGROUND OF THE INVENTION

The present invention relates to a storage disk for information interchange more particularly it relates to an optical storage disk on which information signals are optically recorded and from which they are reproduced.

DESCRIPTION OF THE PRIOR ART

There are two different techniques which are employed for tracking control of optical recording/reproducing systems.

One is called the Continuous Servo method. In this method, as is illustrated in FIG. 2, grooves (G) which provide tracking information to guide a pick-up head are made on a disk surface. Lands (L) are formed in the spaces between grooves. Both grooves (G) and lands (L) can be selected as signal tracks (T) for recording the information signals on. In FIG. 2, the signal track (T) is made in groove (G). The tracking error signal is continuously derived from position detection of the left and the right edge of the aforesaid groove by either the push-pull method or the auxiliary beam method.

The second technique is called the Sampled Servo method. For an optical disk with this tracking format, as is illustrated in FIG. 3, the wobble marks (pits) W1, W2 are located at positions which are offset towards the center of the disk and towards the outer radius from the center of an imaginary track (T) with the predetermined distance of t1. The wobble marks are formed so as to represent the tracking information. These wobble marks are located on the track at the predetermined interval of t2. The tracking error signal is derived from the comparison of signal amplitude of the RF signal at the aforesaid two wobble marks of w1 and w2. The tracking error signal is sampled at each frequency interval t2 and held during the interval.

As was stated above, the two tracking servo methods are theoretically quite different, and there has been no compatibility between the tracking servo circuits for each method.

The optical disks are evaluated for characteristics such as; concentricity, acceleration of radial (horizontal) runout and circularity. Only the optical disks that have cleared the shipping inspection, are supplied to the consumer. In this context, a manufacturer producing some optical disks with one of these two tracking formats and other optical disks with the other of these two formats would have had to separately provide a measuring apparatus for each tracking format, and this resulted in increased production cost.

THE PURPOSE OF THE INVENTION

An object of the present invention is to provide an optical disk which can be evaluated by a single measuring apparatus regardless of which of the two different tracking formats are designated for use in the operation of the apparatus.

This object is accomplished by an optical disk which includes a first comparatively wider region where tracking information according to the first kind of tracking format is recorded, and a second comparatively narrower region where the tracking information according to the second type of tracking format, different from the first one, is recorded. The tracking information is recorded to guide the signal pick-up head.

The measuring apparatus has a tracking servo circuit that utilizes the first type of tracking format and accomplishes the evaluation by attempting to access the wider region of the optical disk. If the tracking information in the first region does not correspond to the tracking format of the tracking servo circuit, the measuring apparatus proceeds to attempt to access the tracking information in the second region of the optical disk.

The following examples are given merely to aid in the understanding of the present invention, and variations may be made by one skilled in the art without departing from the spirit and scope of the present invention.

DESCRIPTION OF THE PREFERRED EMBODIMENT

Figure 1:
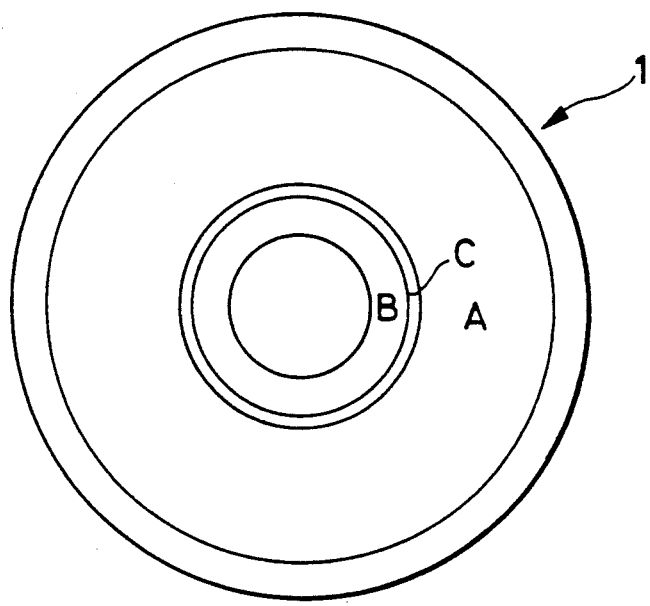
FIG. 1 illustrates a horizontal projection of an optical disk of the present invention.

FIG. 1 illustrates a horizontal projection of the example of the optical disk (1) of the present invention. In this embodiment, the optical disk is separated into two portions of one comparatively wider area (A) and another narrower area (B). Region (A) is the zone in which the user records optical information, while region (B) is the zone on which, generally, the user does not record information. The area (B) in this embodiment is assigned to the inner side of a disk, but it can be located at the outer side of a disk.

Figure 2:
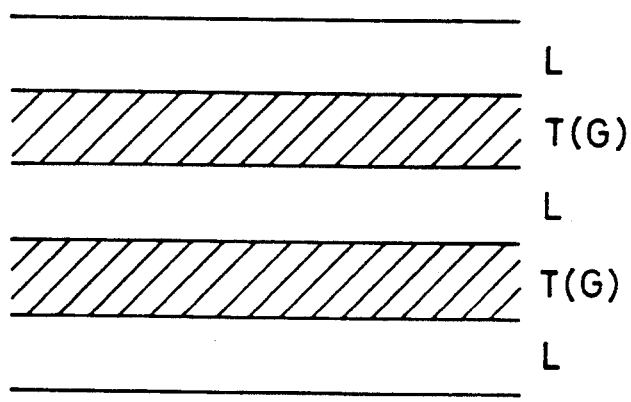
FIG. 2 illustrates a track of the optical disk with format of the Continuous Servo tracking method.
Figure 3:
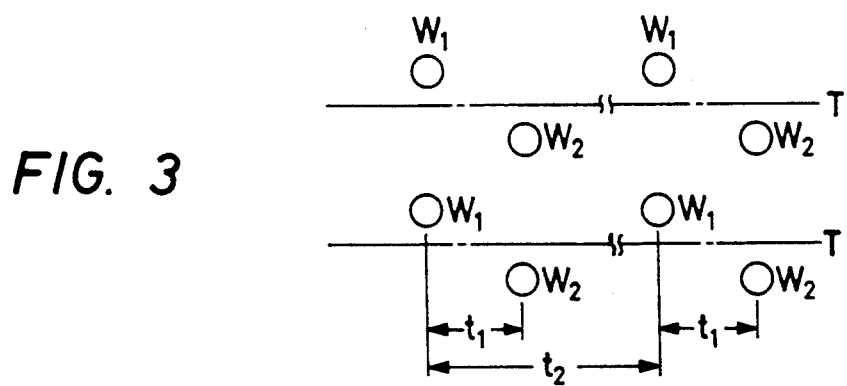
FIG. 3 illustrates a track of the optical disk with format of the Sampling Servo tracking method.

When, in the case of the Continuous Servo tracking format where the grooves and lands in FIG. 2 are selected to be recorded in the region (A). the Sampled Servo tracking format, with wobble marks as shown in FIG. 3, is assigned to the region (B). On the other hand, when the Sampled Servo tracking format with the wobble marks is selected to be recorded in the region (A). the Continuous Servo tracking format having grooves and lands is assigned to the region (B).

The recording of the tracking signal selected for the region (B) can be done in one continuous procedure as well as for the recording of the tracking signal selected for the region (A) without releasing the inserted optical disk from the spindle motor (2). Likewise, it can be done beforehand for the recording of the tracking signal for region (A). As a result, the concentricity, the acceleration of radial run out and the circularity are quite the similar for the two different areas in one optical disk.

Between the regions (A) and (B), the marginal space (C) may be created having no tracking signal recorded therein. In other words, the tracking signals are not continuous between the regions (A) and (B). As a result, a spot beam tracing the track in the region (B) would not confuse the signal from the region (A), instead of the tracking signal from the region (B) by continuously reading from region (B) into region (A), and vice versa.

Figure 4:
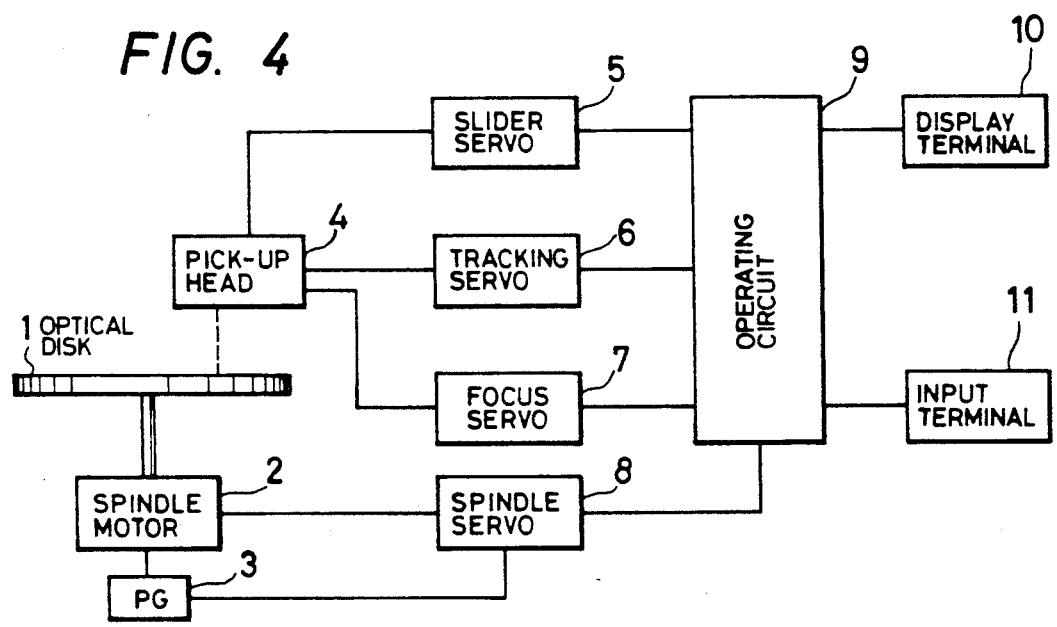
FIG. 4 illustrates block diagram of the evaluation apparatus.

FIG. 4 illustrates a block diagram of an evaluation apparatus. When a command to start measuring is received at input terminal (11), operating circuit (9), which comprises a microprocessor, engages a spindle motor (2) through spindle servo circuit (8) in order to rotate the optical disk (1). Hence, the pulse generator "PG" (3) which is built in the spindle motor (2) works in synchronization with the rotation of the disk.

Information detailing the tracking method which is assigned to the region (A) of the optical disk (1) is applied to the input terminal (11). When the aforesaid tracking method of the region (A) corresponds to that for the tracking servo circuit (6), operating circuit (9) drives the slider servo circuit (5) for the optical pick-up head (4) so as to move it to the start portion of the region (A). When the tracking method utilized in region (A) is different from that for the tracking servo circuit (6), the operating circuit drives the optical pick-up head (4) to the start portion of the region (B).

In another example of the evaluation procedure, information setting forth which region utilizes the same tracking format as the tracking format for the servo circuit (6), may be entered through the input terminal (11) in order to move the optical pick-up head (4) to that region.

The evaluation procedure of the present invention may also use sequential control wherein the optical pick-up head (4) is automatically introduced to one of the regions (A) or (B) and when the tracking servo operates successfully in one region the predetermined evaluation procedure automatically goes on. If the servo does not operate successfully, the optical pick-up head is automatically driven to the other tracking area. As was described above, after the optical pick-up head (4) is located in a start portion of its traceable region, operating circuit (9) begins to control the focus servo circuit (7) in order to close the focus servo loop. At the same time, the tracking servo circuit (6) is driven to close the tracking servo loop. Thus, the spot beam from the optical pick-up head begins to trace the information track on the optical disk (1) properly.

The operating circuit (9) detects the rotation of the optical disk (1) using a pulse signal supplied from the pulse generator (3). At the same time, it monitors the output of the slider servo loop (5) for the error voltage detected during one rotation of the disk (1).

Figure 5:
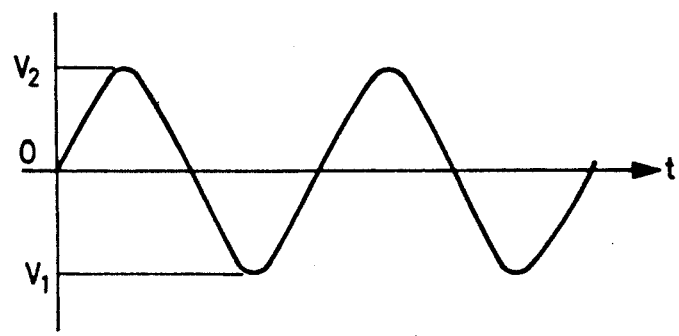
FIG. 5 demonstrates a wave form of the output voltage of the error detecting at a slider servo circuit of the apparatus of FIG. 4.

The aforesaid error voltage varies between two maximums and two minimums during one rotation of the optical disk as shown in FIG. 5. The peak to peak output variation between maximum (V2) and minimum (V1) corresponds to the magnitude of the concentricity of the evaluated disk. The operating circuit (9) calculates the concentricity using the values V1 and V2 and shows the result on a display terminal (10) such as a CRT or a printer.

A value of the acceleration of radial runout is given by a differential calculation of the error voltage output when it crosses the x axis of the FIG. 5. Also, the value of the circularity is gained from the magnitude of the error voltage at each rotation angle with compensation through a contribution from track pitch variation. These calculations and compensations are also accomplished by the operating circuit (9) and given on the display terminal (10).

As was described above, the optical disk in accordance with the present invention comprises a first comparatively wider area where the tracking information of the first kind of tracking format is recorded to guide the pick up head, and the second comparatively narrower area where the tracking information of the second kind of tracking format that is different from the first one is recorded, provides the compatibility of the evaluation apparatus for the inspection of the optical disks which are made with different tracking format and servo method.

What is claimed is:

1. An optical disk for use with a reproducing apparatus of the type which guides a pick-up head in accordance with tracking information carried on said disk, said optical disk comprising:
   a first substantially ring-like disk portion having tracking information in only a first format for guiding said pick-up head;
   a second substantially ring-like disk portion having tracking information in only a second format which is different from said first format, for guiding said pick-up head;
   said first and second disk portions being arranged substantially concentrically with respect to the center to said optical disk, and said second disk portion being arranged towards the center of said disk relative to said first disk portion;
   wherein said first tracking format has tracking information provided in one of grooves and lands formed on a surface of said disk, the lands being between the grooves;
   wherein said second tracking format comprises pits located at first positions towards the center of said disk, and at second positions radially outward from said first positions being separated by a first predetermined distance, said pits located at consecutive first positions and pits located at consecutive second positions both being separated by a second predetermined distance.

2. The optical disk as defined in claim 1, wherein the tracking information of said first substantially ring-like disk portion is servo tracking information.

3. The optical disk as defined in claim 2, wherein the tracking information of said second substantially ring-like disk portion is servo tracking information.

4. An optical disk for use with a reproducing apparatus of the type which guides a pick-up head in accordance with tracking information carried on said disk, said optical disk comprising:
   a first substantially ring-like disk portion having tracking information in only a first format for guiding said pick-up head;
   a second substantially ring-like disk portion having tracking information in only a second format which is different from said first format, for guiding said pick-up head;
   said first and second disk portions being arranged substantially concentrically with respect to the center to said optical disk, and first second disk portion being arranged towards the center of said disk relative to said second disk portion;
   wherein said first tracking format has tracking information provided in one of grooves and lands formed on a surface of said disk, the lands being between the grooves;
   wherein said second tracking format comprises pits located at first positions towards the center of said disk, and at second positions radially outward from said first positions being separated by a first predetermined distance, said pits located at consecutive first positions and pits located at consecutive second positions both being separated by a second predetermined distance.

5. The optical disk as defined in claim 4, wherein the tracking information of said first substantially ring-like disk portion is servo tracking information.

6. The optical disk as defined in claim 5, wherein the tracking information of said second substantially ring-like disk portion is servo tracking information.

7. An optical disk for use with a reproducing apparatus of the type which guides a pick-up head in accordance with tracking information carried on said disk, said optical disk comprising:
 a first substantially ring-like disk portion having tracking information in only a first format for guiding said pick-up head;
 a second substantially ring-like disk portion having tracking information in only a second format which is different from said first format, for guiding said pick-up head, said second disk portion being arranged towards the center of said disk relative to said first disk portion; and
 a third substantially ring-like disk portion located between said first disk portion and said second disk portion, said third disk portion having no tracking information recorded therein,
 said first, second and third disk portions being arranged substantially concentrically with respect to the center of said optical disk,
 wherein the first tracking format of said first disk portion has tracking information provided in grooves with a land disposed between adjacent grooves formed on a surface of said disk, and the second tracking format of said second disk portion comprises pits located at first positions towards the center of said disk, and at second positions radially outward from said first positions, said pits at said first and second positions being separated by a first predetermined distance, said pits located at consecutive first positions and pits located at consecutive second positions both being separated by a second predetermined distance which is different from the first predetermined distance.

* * * * *